(12) United States Patent
French et al.

(10) Patent No.: US 6,416,061 B1
(45) Date of Patent: Jul. 9, 2002

(54) HYDRAULIC SUSPENSION SYSTEM

(75) Inventors: Peter John French, College Park; Paul Van De Loo, Norton Summit, both of (AU)

(73) Assignee: Birrana Engineering PTY LTD (AU)

( * ) Notice: Subject to any disclaimer, the term of this patent is extended or adjusted under 35 U.S.C. 154(b) by 0 days.

(21) Appl. No.: 09/762,726
(22) PCT Filed: Aug. 13, 1999
(86) PCT No.: PCT/AU99/00654
§ 371 (c)(1),
(2), (4) Date: Feb. 12, 2001
(87) PCT Pub. No.: WO00/09352
PCT Pub. Date: Apr. 24, 2000

(30) Foreign Application Priority Data

Aug. 13, 1998 (AU) ................................................ PP5215

(51) Int. Cl.⁷ ...................... B60G 21/073; B60G 17/04; F16F 9/06; F16F 9/56
(52) U.S. Cl. ............................... 280/5.514; 280/5.508; 280/6.159; 280/6.16; 280/124.158; 280/124.159; 267/64.16
(58) Field of Search .......................... 267/64.16, 64.17, 267/218, 200; 188/378, 379, 322.18; 280/5.508, 5.514, 6.159, 6.16, 124.158, 124.159

(56) References Cited

U.S. PATENT DOCUMENTS

| | | | |
|---|---|---|---|
| 3,550,993 A | * | 12/1970 | Peiffer .................. 280/124.159 |
| 3,885,777 A | | 5/1975 | de Carbon |
| 3,951,392 A | | 4/1976 | de la Faille |
| 4,664,410 A | | 5/1987 | Richard |
| 4,711,127 A | | 12/1987 | Hafner |
| 4,844,124 A | | 7/1989 | Stich et al. |
| 5,102,161 A | * | 4/1992 | Williams ................ 137/625.62 |
| 5,150,917 A | | 9/1992 | Kawabata |
| 5,287,277 A | * | 2/1994 | Mine et al. ............... 280/5.514 |
| 5,419,130 A | | 5/1995 | Ruckganer et al. |
| 5,587,907 A | * | 12/1996 | Shibata et al. ........... 280/5.508 |
| 5,601,306 A | * | 2/1997 | Heyring ...................... 280/508 |
| 5,619,413 A | | 4/1997 | Oakley |
| 5,684,698 A | * | 11/1997 | Fujii et al. ..................... 180/41 |
| 5,935,181 A | * | 8/1999 | Iwasaki ....................... 180/197 |
| 5,988,655 A | * | 11/1999 | Sakai et al. ............... 267/64.17 |

FOREIGN PATENT DOCUMENTS

| | | |
|---|---|---|
| DE | 3832625 A1 * | 4/1989 |
| EP | 00 14134 | 8/1980 |
| EP | 0045268 | 2/1982 |
| EP | 0251365 | 1/1988 |
| FR | 2585795 | 2/1987 |
| FR | 2 585 795 A1 * | 2/1987 |

* cited by examiner

Primary Examiner—Lanna Mai
Assistant Examiner—Ruth Ilan
(74) Attorney, Agent, or Firm—Webb Ziesenheim Logsdon Orkin & Hanson, P.C.

(57) ABSTRACT

This invention relates to hydraulic suspension systems and in particular to vehicle oleopneumatic suspension systems employing sliding pillar struts. There is provided a suspension system for a vehicle comprising a plurality of suspension struts, each mounted between a vehicle body and a wheel assembly, each including a cylinder having a closed end and an inner bore; a piston rod slideable within the inner bore having a proximal end which terminates within the inner bore and a distal end which extends from the inner bore. Between the inner bore and the piston rod there is mounted an oil seal which seals a strut volume. A hydrostatic bearing is mounted within and vents into the strut volume. A hydraulic circuit and associated control system is adapted to control flow of hydraulic fluid between the strut volume and a reservoir, thereby providing control of at least the time-averaged axial position of the piston rod relative to its corresponding inner bore.

20 Claims, 5 Drawing Sheets

HYDRAULIC SUSPENSION SYSTEM

FIELD OF THE INVENTION

The present invention relates to hydraulic suspension systems and in particular to vehicle oleopneumatic suspension systems employing sliding pillar struts.

BACKGROUND

Large load hauling trucks typically use oleopneumatic (gas over oil) sliding pillar suspension struts to provide a simple combined spring and damper suspension. These sliding pillar struts typically also provide the only mechanical connection between the unsprung mass and the vehicle and therefore are subject to loads in all directions. In particular, due to the geometry between the wheel, its connection to the strut and the strut's connection to the vehicle, the strut bearings are subject to significant side loads.

To support side loads transmitted between the unsprung mass and the vehicle, plain bearings are generally provided within the sliding pillar struts. Plain bearings typically used do not have a low enough co-efficient of friction to obtain optimum suspension performance (at worst this may cause a strut to lock, leaving only the tyre to provide suspension). Poor ride, high tyre forces and poor handling result. Furthermore, significant forces and vibrations are transmitted from the unsprung mass to the vehicle. This can be detrimental to both the life of the truck itself and to the comfort and/or health of the person operating the truck.

Conventional suspension systems used in a wide range of applications including large load hauling trucks, have the disadvantage that they provide optimum ride and handling characteristics for only a narrow range of operating conditions. For instance, with conventional oleopneumatic truck suspensions, the struts are significantly extended when the truck is unladen and are significantly contracted when the truck is laden. This reduces the effective amount of strut travel available in both the laden and unladen states, resulting in poor utilization of the total strut travel available. Furthermore, because very little suspension travel is left in the unladen state before the struts are fully extended (and very little suspension travel is left in the laden state before the struts are fully contracted), a relatively stiff spring rate is required which further degrades suspension performance.

It is therefore an object of this invention to overcome at least some of the aforesaid disadvantages or to at least offer the public a useful choice.

SUMMARY OF THE INVENTION

According to a first aspect of the invention there is provided an oleopneumatic strut comprising:
- a cylinder having a substantially closed end and an inner bore;
- a piston rod slideable within said inner bore having a proximal end which terminates within said inner bore and a distal end which extends from said inner bore;
- an oil seal between said inner bore and said piston rod which thereby seals a strut volume such that axial movement of said piston rod towards said closed end of said inner bore reduces said strut volume and axial movement of said piston rod away from said closed end of said inner bore increases said strut volume; and
- a hydrostatic bearing, located within said strut volume between said piston rod and said inner bore, mounted to either said piston rod or said inner bore, and venting into said strut volume;

characterised in that, in use where hydraulic fluid is supplied to said bearing, control of flow of hydraulic fluid between said strut volume and a reservoir provides control of the axial position of said piston rod relative to its corresponding inner bore.

Preferably said hydrostatic bearing is mounted to said piston rod.

According to a second aspect of the present invention, there is provided a suspension system for a vehicle comprising a plurality of suspension struts, each mounted between a vehicle body and a wheel assembly, each comprising:
- a cylinder having a closed end and an inner bore;
- a piston rod slideable within said inner bore having a proximal end which terminates within said inner bore and a distal end which extends from said inner bore;
- an oil seal between said inner bore and said piston rod which thereby seals a strut volume such that axial movement of said piston rod towards said closed end of said inner bore reduces said strut volume and axial movement of said piston rod away from said closed end of said inner bore increases said strut volume;
- a compressible mass of gas and hydraulic fluid contained within said strut volume;
- a hydrostatic bearing, located within said strut volume between said piston rod and said inner bore, mounted to either said piston rod or said inner bore, and venting into said strut volume; and
- a hydraulic circuit and associated control system adapted to control flow of said hydraulic fluid between said strut volume and a reservoir, thereby providing control of at least the time-averaged axial position of said piston rod relative to its corresponding inner bore.

The control system also prevents the unwanted extension of each strut (time-averaged axial extension of each piston rod relative to its corresponding inner bore) which would otherwise occur due to the flow of fluid from the hydrostatic bearing into its strut volume.

Preferably, each said strut further comprises a second hydrostatic bearing axially displaced from the first said hydrostatic bearing in a direction away from said proximal end of said piston rod and mounted between said piston rod and said inner bore.

The ability of the control system to control the ride-height of the vehicle and in particular, the ability of the control system to provide the same or similar at-rest strut displacement for the truck in both its laden and unladen states provides a number of advantages. For instance, in the embodiments described below, it allows a softer spring rate to be used thereby allowing greater suspension travel from the at rest position in both the laden and unladen states.

Preferably, said suspension system further comprises control of roll angle.

Specific embodiments of the invention will now be described with reference to and as illustrated in the accompanying Figures. These embodiments are illustrative and are not meant to be restrictive of the scope of the invention.

DETAILED DESCRIPTION OF THE PREFERRED EMBODIMENTS

Figure 1:
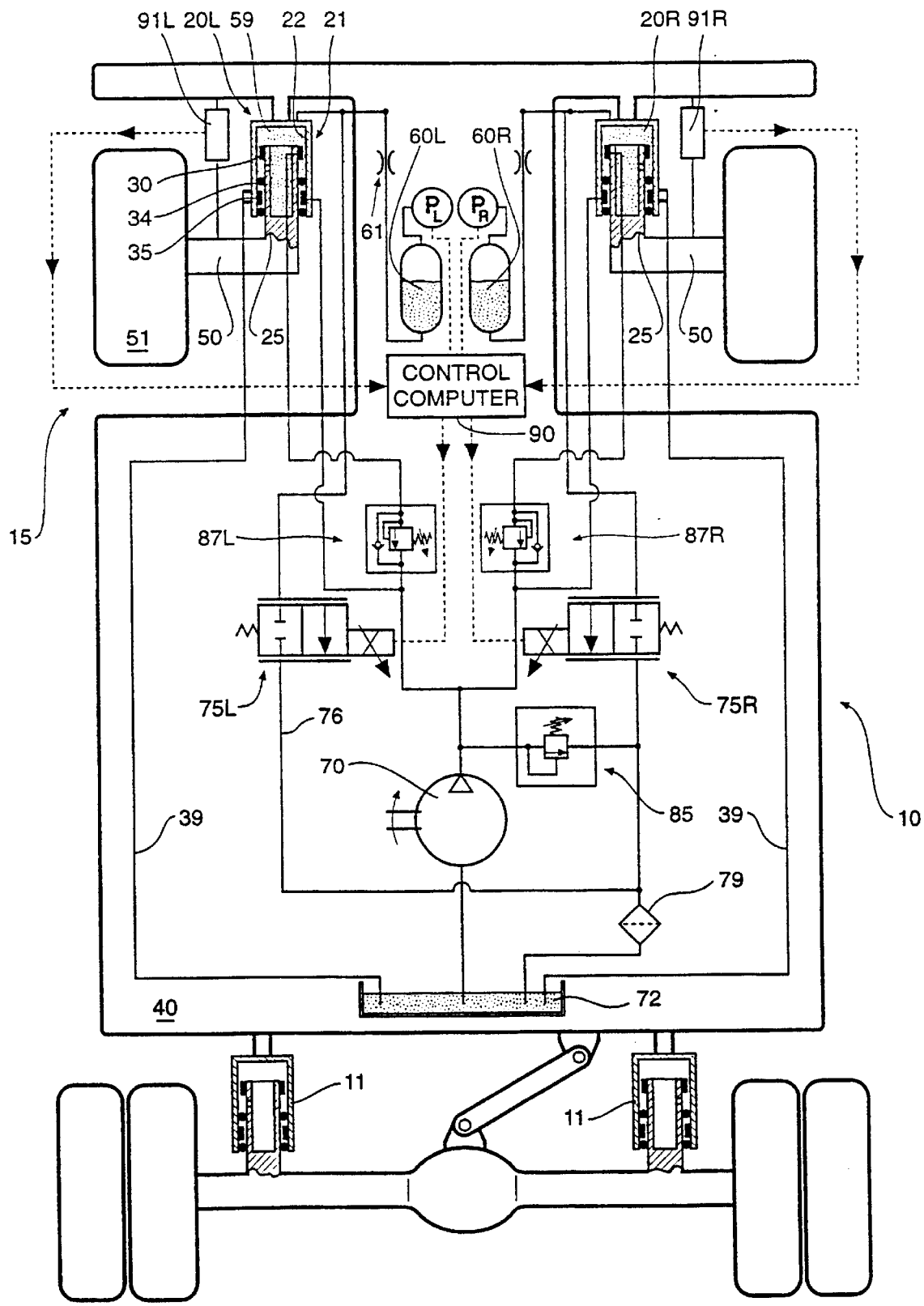
FIG. 1 is a schematic view of a first suspension system for a vehicle in accordance with the invention.

A suspension system for a vehicle is shown schematically in FIG. 1. FIG. 1 shows a typical dump truck 10 having a rear suspension with conventional oleopneumatic (gas-over-oil) substantially vertical struts (rear struts 11) and a ride-height controlled front suspension system 15 with hydrostatic bearings according to the invention. Ride-height controlled suspension, in combination with hydrostatic bearings, is provided on the front suspension only in this application as the driver's cabin is typically located over the front suspension and the rear struts are not offset and hence are not susceptible to friction locking. Ride-height controlled suspension could equally be applied to the rear suspension.

Front suspension 15 is provided on left and right sides by sliding pillar strut 20 which comprises a cylinder 21 having an inner bore 22 and a closed end 23, and a piston rod 25 which is connected at is distal end to lower suspension arm 50 which in turn supports front wheels 51. Piston rod 25 has an upper hydrostatic bearing 30 and a lower hydrostatic bearing 35 which are mounted concentrically around the piston rod 25. These hydrostatic bearings operate by providing a lubricating film, fed from a source of high pressure fluid, between opposing bearing surfaces.

Figure 2:
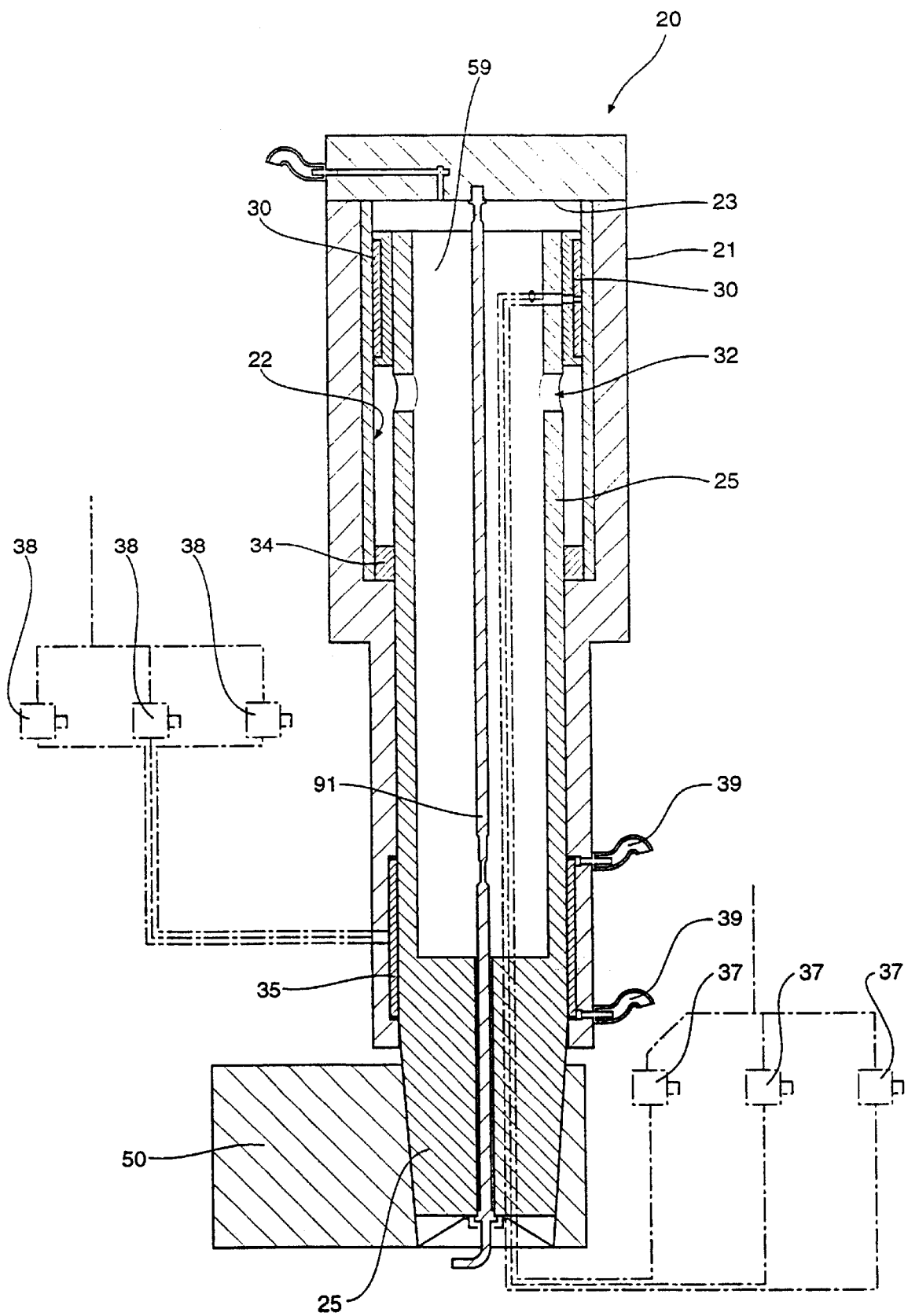
FIG. 2 is a sectional view of a strut which forms part of the suspension system of FIG. 1.

The structure of these struts are shown in more detail in FIG. 2 in which an oil seal 34 is shown. The volume above this seal 34 (designated the strut volume 59) is reduced as the piston rod 25 is moves into the inner bore 22 and conversely is increased as the piston rod 25 moves out of the inner bore 22. Fluid passage 32 allows relatively unrestricted hydraulic fluid flow between the volumes either side of the upper, hydrostatic bearing 30. Within this strut volume 59 is hydraulic fluid and nitrogen gas (the gas is within accumulator 60 which forms part of the strut volume). The gas provides a similar effect to a rising rate mechanical spring. Because the ride-height of the vehicle is controlled, a larger gas volume can be used providing a softer spring rate allowing greater suspension travel in both laden and unladen states.

The cylinder 21 is mechanically connected to the chassis 40 of the truck and the lower end of the piston rods 25 connects to the lower suspension arms 50 upon which wheels 51 are mounted.

The front suspension struts 20L and 20R allow movement of the lower suspension arm 50 up and down. In addition, steering of the wheels 51 is enabled by rotation of piston rod 25 within inner bore 22.

The above-described geometry results in significant side loads being imparted to the hydrostatic bearings 30 and 35. In contrast to plain bearings, these hydrostatic bearings provide reduced friction and therefore a reduced tendency to bind as a result of these side loads.

Upper hydrostatic bearing 30 is mounted to the piston rod 25. It is supplied with high pressure hydraulic fluid via regulators 37, which ensure an appropriate distribution of hydraulic fluid around the bearing surface (refer FIG. 2). Having passed through the bearing, the hydraulic fluid vents into the strut volume 59.

Lower hydrostatic bearing 35 is mounted to inner bore 22. It is supplied with high pressure hydraulic fluid via regulators 38, which again ensure an appropriate distribution of hydraulic fluid around the bearing surface (refer FIG. 2). Having passed through the bearing, the hydraulic fluid drains through drain lines 39 to tank or reservoir 72.

Although in the preferred embodiments of the invention hydrostatic bearings 30 and 35 are mounted to the piston rod 25 and the inner bore 22 respectively, alternative mounting positions may be used (for instance both bearings may be mounted to the inner bore).

Figure 3:
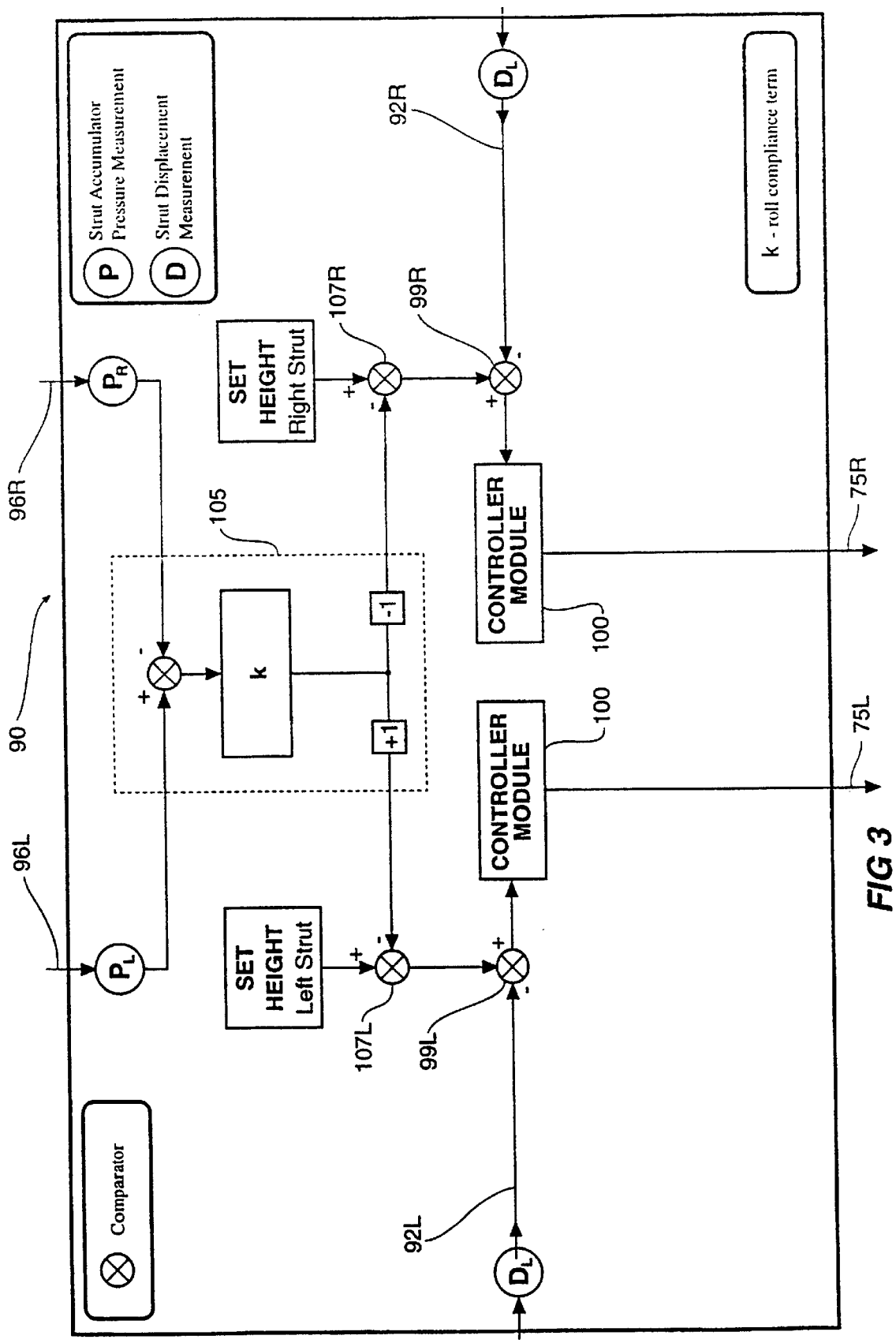
FIG. 3 is a schematic view of the control system for the suspension system of FIG. 1.
Figure 4:
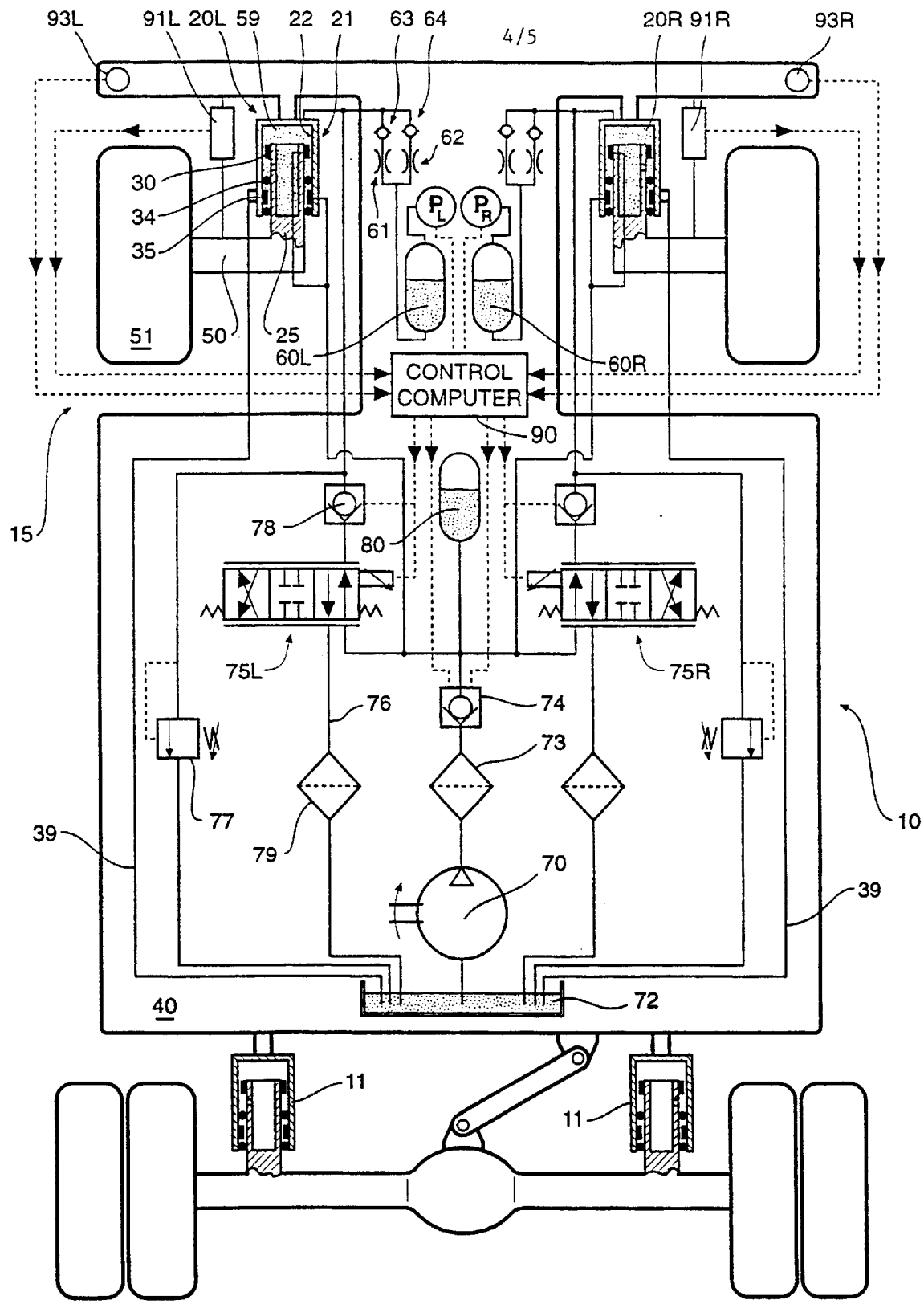
FIG. 4 is a schematic view of a second suspension system for a vehicle in accordance with the invention.
Figure 5:
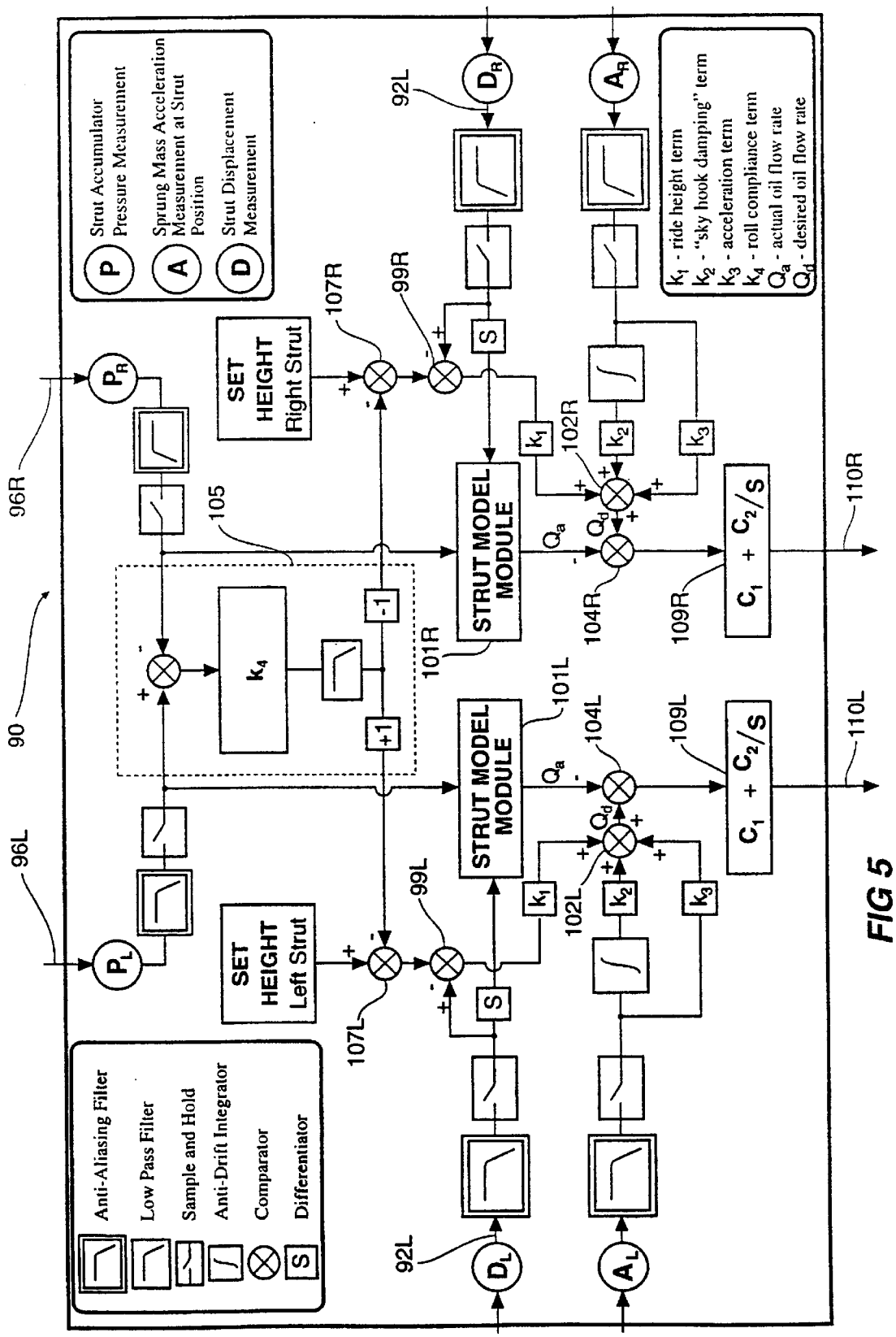
FIG. 5 is a schematic view of the active control system for the suspension system of FIG. 4.

The suspension system so far described is common to both the first embodiment of the invention shown in FIGS. 1, 2 and 3 and the second embodiment of the invention shown in FIGS. 4 and 5.

The suspension system of the first (simpler) embodiment of the invention provides two main advantages over conventional suspension systems. Firstly it applies ride height levelling (by controlling the time-averaged axial position of the piston rods relative to their corresponding inner bores) to automatically maintain mean ride height for varying vehicle payloads. This allows the maximum suspension travel in each direction to be maintained and thus allows a lower spring rate to be used. This function maintains the time averaged ride height irrespective of payload, it does not respond to individual bumps or other relatively fast events. Secondly it provides control of roll compliance. This is important because the longer term effect of ride height levelling is to provide infinite roll stiffness. In this embodiment the ride levelling is applied to the front suspension only. Without control of roll compliance, this may result in overloading of one wheel in cases such as uneven payload distribution or when travelling along a long sweeping corner or cambered road. It would also tend to produce undesirable handling characteristics. The suspension system of this first embodiment is thus designed to sense and compare strut pressures and reduce the set ride height on one side relative to the other when the load (sensed by measuring strut oil or gas pressure) is consistently higher on that side.

These advantages are achieved through the combination of the suspension system described thus far with the hydraulic circuit (shown in FIG. 1) and associated control system (shown in FIG. 3).

Referring to FIG. 1, a fixed displacement hydraulic pump 70, having an inlet connected to tank (reservoir) 72, in conjunction with relief valve 85, provides an approximately constant output pressure. Connected to the outlet of pump 70, on both left and right sides, is a pair of hydraulic lines which feed the upper and lower hydrostatic bearings 30 and 35 as described previously with reference to FIG. 2. For ease of description, only one of the two sides will be described (the other is identical).

Left and right proportional valves 75L and 75R control the flow of fluid out of their corresponding strut volumes 59. This enables control of the ride height of the chassis 40 with respect to the ground level upon which the wheels of the vehicle traverse.

The above-described hydraulic circuit of this embodiment of the invention is but one of many possible hydraulic circuits which may be employed to provide ride-height control of a vehicle in accordance with the invention. Alternatives included circuits in which the hydraulic fluid is supplied and removed from elsewhere within the strut volume 59, for instance directly from the accumulator 60 instead of between the orifice valves 61 and 62 and the upper end of the strut 20.

Control of the hydraulic circuit is provided by control system 90 as shown in FIGS. 1 and 3. This control system 90 receives strut displacement data from sensors 91L and 91R. These inputs are processed (using a control system schematically represented in FIG. 3) and separate outputs from the control system 90 are then provided to proportional valves 75L and 75R. These outputs determine the positions of proportional valves 75L and 75R and thereby the control of the hydraulic oil flow out of the strut volumes 59L and 59R.

Explaining the control system represented by FIG. 3 in more detail, displacement sensors 91L and 91R produce signals 92L and 92R respectively which give the strut position relative to the chassis 40.

For each strut, the desired oil flow rate, is computed from the "relative" strut displacement (as provided by comparator 99) as shown in FIG. 3. Controller module 100 provides outputs 110L and 110R for control of the positions of proportional valves 75L and 75R respectively, thereby controlling the flow of oil out of strut volumes 59L and 59R.

With the system described thus far, the front suspension will have very high (if not infinite) roll stiffness in some circumstances, for instance when the vehicle is travelling around a long sweeping corner. This is undesirable because it could cause overloading of the outside front tyre and cause undesirable handling characteristics. To overcome these problems, a roll compliance module 105 can be introduced as shown in FIG. 3.

Roll compliance is achieved by a comparison of the left and right pressure sensor signals 96L and 96R as shown in FIG. 3. Signals from the roll compliance module 105 are sent to their corresponding roll compliance comparators 107 (as shown in FIG. 3) which modify the set heights (set points) fed to the displacement comparators 99. In this embodiment, the roll compliance module effectively reduces the set ride height at the strut carrying the higher load when there are sustained pressure differences between left and right struts. The ride heights are varied symmetrically; the overloaded strut's ride height is reduced whilst the underloaded strut's ride height is increased. Optionally the roll compliance module 105 may be configured to limit the roll angle.

The control module 100 response time is slow relative to the wheel hop frequency (determined by the unsprung mass and tyre stiffness for the particular application) and the normal range of sprung mass frequencies in heave, pitch and roll caused by bumps and other disturbances. This prevents the system responding to these events, which are handled by the passive elements in the suspension (gas springs and dampers) as in conventional suspension systems.

The control module 100 design uses a PID control strategy which provides good transient performance as well as minimising steady state errors.

With the system described so far, the only path for hydraulic fluid out of the strut volumes during the system's operation is via proportional valves 75L and 75R. When the system is shut down, pump 70 ceases to operate and proportional valves 75L and 75R are closed. The mass of the vehicle will cause the struts to settle by forcing hydraulic fluid out of the strut volumes via reverse flow through the upper bearings 30 and then through the lower hydrostatic bearings 35 and through drain lines 39. The flow out through the lower bearings 35 reduces friction and assists in providing a controlled lowering of the vehicle onto its bump stops.

Optionally, sequencing valves 87L and 87R may be positioned between the upper and lower bearing 30 and 35, as shown in FIG. 1, to restrict draining of the strut volumes 59 and retain set minimum pressures within the strut volumes 59. This enables the suspension system to reach operating height more quickly on system start up.

A second embodiment of the invention is shown in FIG. 4.

In addition to providing control of the ride-height and roll compliance, the control system of this embodiment of the invention (refer FIG. 5) also provides "active" suspension control.

"Active" suspension systems are systems in which the springs and dampers of conventional passive systems are replaced, at least in part, by actuators which act as force producers according to some control law. Generally the actuator control bandwidth extends substantially beyond the wheel hop frequency.

With the strut design of the second embodiment of the invention, the strut is oleopneumatic and itself becomes an actuator by virtue of the hydraulic circuit and associated control system shown in FIGS. 4 and 5.

With the second embodiment of the invention, active control is achieved by varying the hydraulic flow rate into and out of strut volume 59. This form of active control has the advantage that it directly modifies the performance of the oleopneumatic strut (according to a control algorithm explained in detail with reference to FIG. 5 below). In contrast, most conventional forms of active suspension use a separate actuator to produce forces according to a control algorithm. The actuator would typically be between the spring and unsprung mass and may be in series or in parallel with other suspension elements. These separate actuators greatly add to the complexity and cost of the overall suspension system.

Typically the actuators of active suspension systems operate with force transducers providing inner loop feedback signals to their controllers, particularly where the actuators are hydraulic and act in parallel with, or totally replace, passive suspension elements. With the second embodiment of the invention, instead, the actuator is in series with the passive elements. This arrangement can often be better controlled by treating the actuator as a displacement or velocity producer rather than a force producer and the inner control loop parameter used is then actuator displacement or velocity. In the second embodiment of this invention the inner loop parameter is oil flow rate which is equivalent to velocity. The use of an actuator in series with passive suspension elements allows the actuator control bandwidth to be reduced to less than the wheel hop frequency, as the passive elements can respond to the higher frequency motions independently.

In addition to active control of damping, fixed damping of the motion of the piston rod 25 into and out of the inner bore 22 is provided by orifice valves 61 in combination with check valve 63 and orifice valve 62 in combination with check valve 64 respectively. Having separate orifice valves for oil flow into the inner bore 22 and out of the inner bore 22 enables differing fixed damping characteristics for the movement of the piston rod 25 into and out of the inner bore 22. Although in this embodiment of the invention the fixed damping orifice valves are mounted external to the strut, they may also be mounted within the strut within fluid passages in the piston rod wall between the volumes either side of the upper hydrostatic bearing 30.

A hydraulic circuit (shown in FIG. 4) and associated control system (shown schematically in FIG. 5) is provided to enable the control of the suspension, supply of hydraulic fluid to the hydrostatic bearings and to prevent the strut extending due to the leakage of hydraulic fluid into the strut volume 59 by controlling the flow of oil out of the strut volume 59. The components forming the hydraulic circuit are as follows.

Referring to FIG. 4, a variable displacement hydraulic pump 70 has an inlet connected to tank (reservoir) 72 and an outlet which is connected through a filter 73 and then a pilot operated check valve 74 to left and right servo valves 75L and 75R. Servo valves 75L and 75R are connected to their corresponding strut volumes 59 (via pilot operated check valves 78) as shown in FIG. 4. Hydraulic pump 70 is regulated to vary its hydraulic oil delivery flow rate to achieve an approximately constant output pressure.

Also connected to the pump 70 (via the filter 73 and pilot operated check valve 74), on both left and right sides, is a pair of hydraulic lines which feed the upper and lower hydrostatic bearings 30 and 35 as described previously with reference to FIG. 2. For ease of description, only one of the two sides will be described (the other is identical). A servo valve return line 76 is connected via a filter 79 to the tank (reservoir) 72. A pressure relief valve 77 is provided to prevent excessive pressure within the strut volume 59 (which, as stated previously, includes accumulator 60).

A main accumulator 80 is also provided and is connected into the common hydraulic circuit as shown in FIG. 4. The accumulator 80 allows a smaller pump to be used and provides for peak hydraulic flows.

Left and right servo valves 75L and 75R control the flow of fluid into and out of their corresponding strut volumes 59. This enables active suspension control and control of the ride height of the chassis 40 with respect to the ground level upon which the wheels of the vehicle traverse.

The above-described hydraulic circuit of this embodiment of the invention is but one of many possible hydraulic circuits which may be employed to provide ride-height control of a vehicle in accordance with the invention. Alternatives included circuits in which the hydraulic fluid is supplied and removed from elsewhere within the strut volume 59, for instance directly from the accumulator 60 instead of between the orifice valves 61 and 62 and the upper end of the strut 20.

Control of the hydraulic circuit is provided by control system 90 as shown in FIGS. 4 and 5. This control system 90 receives positional data from sensors 91L and 91R and acceleration data from sensors 93L and 93R. These inputs are processed (using a control system schematically represented in FIG. 5) and separate outputs from the control system 90 are then provided to servo valves 75L and 75R. These outputs determine the positions of servo valves 75L and 75R and thereby the control the hydraulic oil flow into and out of the strut volumes 59L and 59R.

Explaining the control system represented by FIG. 5 in more detail, displacement sensors 91L and 91R produce signals 92L and 92R respectively which are differentiated by differentiator S to give strut velocity relative to the chassis 40. Accelerometers 93L and 93R produce chassis acceleration signals 94L and 94R respectively. These signals are integrated to give an absolute velocity for both sides of the truck 10 and to thereby allow "skyhook" damping to be included in the control algorithm for both left and right struts.

For each strut, the desired oil flow rate, Qd, is computed from the "relative" strut displacement (as provided by comparator 99), the chassis acceleration and the absolute velocity of the sprung mass by comparator 102 as shown in FIG. 5. The actual oil flow rate, Qa, for each strut, is computed via the strut model module 101 from strut pressure signals 96L and 96R and the velocities of the struts relative to the chassis as computed by differentiators S. Alternatively this parameter could be measured directly using a flow meter. Actual flow/desired flow comparator 104 provides outputs to modules 109L and 109R which in turn provide outputs 110L and 110R for control of the positions of servo valves 75L and 75R respectively, thereby controlling the flow of oil into and out of strut volumes 59L and 59R. Modules 109L and 109R include integrating terms $C^2/s$ which provide a servovalve offset to service hydrostatic bearing return flow such that zero ride-height error occurs.

With the system described thus far, the front suspension will have very high (if not infinite) roll stiffness in some circumstances, for instance when the vehicle is travelling around a long sweeping corner. This is undesirable because it could cause overloading of the outside front tyre and cause undesirable handling characteristics. To overcome these problems, a roll compliance module 105 can be introduced as shown in FIG. 5.

As with the above-described first embodiment, roll compliance is achieved by a comparison of the left and right pressure sensor signals 96L and 96R as shown in FIG. 5. Signals from the roll compliance module 105 are sent to their corresponding roll compliance comparators 107 (as shown in FIG. 5) which modify the set heights (set points) fed to the displacement comparators 99.

Optionally, the hydraulic circuit may be modified to direct flow of hydraulic fluid out of the strut volume 59 and into the tank 72 via the lower hydrostatic bearing 35 upon shut down of the vehicle, thereby reducing friction locking of the lower bearing 35 as the vehicle settles onto its bump stops. Such modification may be broadly as described in relation to the above first (simpler) embodiment and as shown in FIG. 1.

The control algorithms themselves, for either of the two above-described embodiments, or any other embodiment, may be made adaptive, that is the algorithm may be varied during operation of the vehicle in response to operating conditions to optimise it for the conditions. For example, gains may be altered depending on whether the vehicle is laden or unladen (detected by monitoring strut pressures). Different gains or filters may be applied for different vehicle speeds (this would require a speed sensor input to the control system). The roll stiffness algorithm may be varied depending upon the cornering angle or lateral acceleration (this would require additional sensors). The algorithm may also be varied in response to prevailing road conditions.

The control computer for either of the two above-described embodiments, or any other embodiment, may be implemented using a computer or microprocessor and appropriate software or may alternatively be implemented in hardware using the appropriate components.

Various combinations of working fluids may be used within the strut volume. Although nitrogen is preferred, air or other gases may be used.

While the present invention has been described in terms of preferred embodiments, in order to facilitate better understanding of the invention, it should be appreciated that various modifications can be made without departing from the principles of the invention. Therefore, the invention should be understood to include all such modifications within its scope.

The claims defining the invention are as follows:

1. A suspension system for a vehicle comprising a plurality of suspension struts, each mounted between a vehicle body and a wheel assembly, each comprising:

a cylinder having a substantially closed end and an inner bore;

a piston rod slideable within said inner bore and having a proximal end which terminates within said inner bore and a distal end which extends from said inner bore;

an oil seal between said inner bore and said piston rod which thereby seals a strut volume such that axial movement of said piston rod towards said closed end of said cylinder reduces said strut volume and axial movement of said piston rod away from said closed end of said cylinder increases said strut volume;

a compressible mass of gas and hydraulic fluid contained within said strut volume;

a hydrostatic bearing, located within said strut volume between said piston rod and said inner bore, mounted to either said piston rod or said inner bore, and venting into said strut volume; and a hydraulic circuit and associated control system adapted to control flow of said hydraulic fluid between said strut volume and a reservoir thereby providing control of at least the time-averaged axial position of said piston rod relative to its corresponding inner bore.

2. The suspension system according to claim 1, wherein each said hydraulic circuit and associated control system is adapted to control said flow out of said strut volume.

3. The suspension system according to claim 1, wherein flow of said hydraulic fluid into each of said strut volumes is exclusively through said venting.

4. The suspension system according to claim 1, wherein said hydrostatic bearing is mounted to said piston rod.

5. The suspension system according to claim 1, wherein each said strut further comprises a second hydrostatic bearing axially displaced from the first said hydrostatic bearing in a direction away from said proximal end of said piston rod, located between said piston rod and said inner bore, and mounted to either said inner bore or said piston rod.

6. The suspension system according to claim 1, wherein said plurality of suspension struts includes at least one left and one right strut and said control of each said piston rod's axial position is relative to a respective set point, further comprising a control system that adjusts either or both said set points when there is a sustained pressure difference between pressures in said left and right strut volumes, thereby modifying said vehicle'roll angle and the force acting on each said strut.

7. The suspension system according to claim 1, wherein said hydraulic circuit and associated control system are adapted to control said flow of hydraulic fluid into and out of said strut volume thereby providing active control of said suspension.

8. The suspension system according to claim 7, wherein said hydrostatic bearing is mounted to said piston rod.

9. The suspension system according to claim 7, wherein each said strut further comprises a second hydrostatic bearing axially displaced from the first said hydrostatic bearing in a direction away from said proximal end of said piston rod, located between said piston rod and said inner bore, and mounted to either said inner bore or said piston rod.

10. The suspension system according to claim 7, wherein said plurality of suspension struts includes at least one left and one right strut and said control of each said piston rod's axial position is relative to a respective set point, further comprising a control system that adjusts either or both said set points when there is a sustained pressure difference between pressures in said left and right strut volumes, thereby modifying said vehicle's roll angle and the force acting on each said strut.

11. The suspension system according to claim 5, wherein said second hydrostatic bearing is located outside of said strut volume.

12. The suspension system according to claim 11, wherein said hydraulic circuit is adapted to direct flow of said fluid out of said strut volume and into said reservoir via said second bearing upon shut down of said vehicle, thereby reducing friction locking of said second bearing during said shut down.

13. The suspension system according to claim 12, further comprising a means for restricting said flow of said fluid out of said strut volume to thereby retain a set minimum pressure within said strut volume.

14. The suspension system according to claim 1, wherein each said strut further comprises an accumulator external to said strut and connected to said strut to thereby form part of said strut volume.

15. The suspension system according to claim 2, wherein flow of said hydraulic fluid into each of said strut volumes is exclusively through said venting.

16. The suspension system according to claim 2, wherein said hydrostatic bearing is mounted to said piston rod.

17. An oleopneumatic strut comprising:

a cylinder having a substantially closed end and an inner bore;

a piston rod slideable within said inner bore and having a proximal end which terminates within said inner bore and a distal end which extends from said inner bore;

an oil seal between said inner bore and said piston rod which thereby seals a strut volume such that axial movement of said piston rod towards said closed end of said cylinder reduces said strut volume and axial movement of said piston rod away from said closed end of said cylinder increases said strut volume; and a hydrostatic bearing, located within said strut volume between said piston rod and said inner bore, mounted to either said piston rod or said inner bore, and venting into said strut volume, wherein, in use where hydraulic fluid is supplied to said bearing, control of flow of hydraulic fluid between said strut volume and a reservoir provides control of the axial position of said piston rod relative to its corresponding inner bore.

18. The oleopneumatic strut according to claim 17, wherein said hydrostatic bearing is mounted to said piston rod.

19. The oleopneumatic strut according to claim 17, further comprising a second hydrostatic bearing axially displaced from said first hydrostatic bearing in a direction away from said proximal end of said piston rod, located between said piston rod and said inner bore, and mounted to either said inner bore or said piston rod.

20. The oleopneumatic strut according to claim 18, further comprising a second hydrostatic bearing axially displaced from said first hydrostatic bearing in a direction away from said proximal end of said piston rod, located between said piston rod and said inner bore, and mounted to either said inner bore or said piston rod.

* * * * *

UNITED STATES PATENT AND TRADEMARK OFFICE
CERTIFICATE OF CORRECTION

PATENT NO. : 6,416,061 B1
DATED : July 9, 2002
INVENTOR(S) : Peter John French et al.

It is certified that error appears in the above-identified patent and that said Letters Patent is hereby corrected as shown below:

<u>Title page,</u>
Item [87], PCT Pub. Date: "Apr. 24, 2000" should read -- Feb. 24, 2000 --.

<u>Column 9,</u>
Line 45, "vehicle'roll angle" should read -- vehicle's roll angle --.

Signed and Sealed this

Fourth Day of February, 2003

JAMES E. ROGAN
*Director of the United States Patent and Trademark Office*